Sept. 25, 1923.

T. H. ANGLIM 1,468,871

METHOD AND APPARATUS FOR PASTEURIZING MILK

Filed Dec. 1, 1921

Thomas H Anglim, Inventor

By Adrian Sizer, his Attorney

Patented Sept. 25, 1923.

1,468,871

UNITED STATES PATENT OFFICE.

THOMAS H. ANGLIM, OF DUNKIRK, NEW YORK.

METHOD AND APPARATUS FOR PASTEURIZING MILK.

Application filed December 1, 1921. Serial No. 519,112.

*To all whom it may concern:*

Be it known that I, THOMAS H. ANGLIM, a citizen of the United States, residing at Dunkirk, in the county of Chautauqua and State of New York, have invented certain new and useful Improvements in Methods and Apparatus for Pasteurizing Milk, of which the following is a specification.

This invention relates to the art of pasteurizing milk or other liquids, and the primary object is to eliminate the bacteria content to a greater degree than has been found possible by any of the methods employed as now in common practice, without materially changing the chemical condition of the milk, destroying the cream line or rendering the milk unpalatable.

In the art or process of pasteurizing milk as heretofore generally conducted, the milk is subjected to a predetermined degree of heat. This may be for a short interval commonly known in the art as the "flash" process, or it may be for a longer period known as the "holding" process. Both of these processes have disadvantages and frequently fail to accomplish the purpose sought.

In the well known commercially designated proper or perfect pasteurization of milk, the milk is heated to a temperature ranging from 140 degrees to 150 degrees F. and is maintained at this temperature for a period of time ranging from 15 minutes to 1 hour. At the expiration of such time period, the temperature of the milk is increased from 5 to 15 degrees F. after which it is cooled to approximately 55 degrees F. or below.

In the application of all of the processes now in general use, the means for applying heat to the milk comprises some form of receptacle into which the milk is placed, to which the heat is applied, resulting in the heated receptacle transmitting heat to the milk. Obviously the receptacle will have to be brought to a higher degree of heat than it is desired to impart to the milk, and experiments disclose that this variation of the degree of heat is generally from 15 to 20 degrees. Experiments have also shown that when milk comes slowly in contact with a hotter surface than itself, the calcium salts are said to be lost, the salts settle to the bottom and along the sides of the container in the form of insoluble precipitate.

These salts are very necessary for growth and especially for the building of bones in infants feeding on milk.

Experiments have also shown that as the particles of fat that go to make up the cream line, come in contact with a hotter surface than the milk itself, the surface tension of the individual particles of fat is weakened or ruptured, destroying or altering the cream line of the milk.

By the use of my improved method and apparatus, the art of pasteurization of milk is so conducted that the calcium salts do not settle and form insoluble precipitate, nor is the cream line destroyed.

In the application of my improved method of raising the temperature of milk to an effective pasteurizing degree, I do not resort to the application of heat to the milk containing receptacle 15 to 20 degrees higher than that of the milk therein, which often imparts a cooked or scorched taste to the milk. I make no application of heat to the receptacle, or to the milk therein, as understood in the ordinary acceptance of the meaning of applying heat. I raise the temperature of the milk to a pasteurizing degree by creating the required temperature within the milk itself by making use of the effect of the resistance encountered by an electric current passing through the milk to be pasteurized.

It will be obvious that in the treatment of milk by my improved method, the milk does not come in contact with any surface of a higher temperature than the body of the milk itself. It is equally obvious why the calcium salts or the cream line in the milk are not affected, or why a scorching of the milk can not occur.

Other objects and advantages will be pointed out or implied in the following details of description in connection with the accompanying drawings in which.

Referring to the drawings in detail, in which similar reference characters correspond with similar parts, the invention consists in the apparatus and method which will now be described in detail, as follows.

Figure 1:
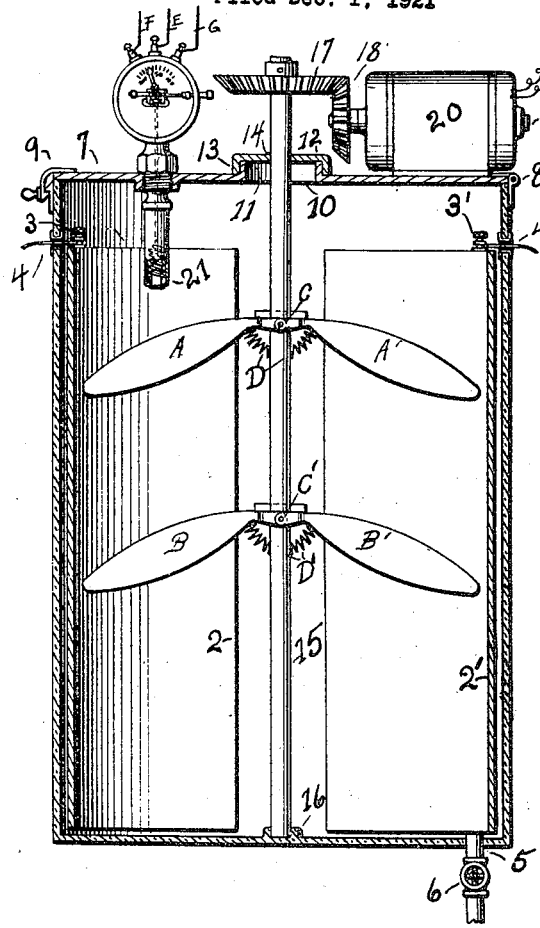
Fig. 1 is a sectional view illustrating one form of the invention.
Figure 2:
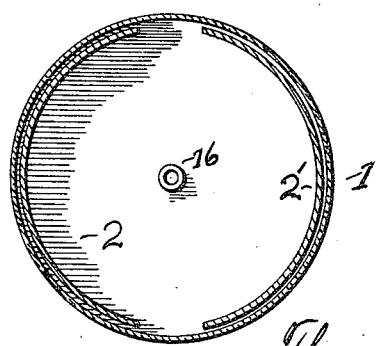
Fig. 2 is a radial sectional view of the invention shown in Fig. 1.

1 designates a milk container formed of porcelain, glass or other suitable material, into which are placed the electrodes or plates 2 and 2'. These electrodes are shaped to conform to the curve of the sides of the container 1, and are located in close proximity thereto. At the upper end of each of the electrodes 2 and 2', are suitable connections comprising the binding posts 3 and 3'. Attached to the binding posts and passing out through apertures in the side of the container 1, are the electrical cables 4 and 4' leading to a source of electrical supply (not shown).

The electrodes 2 and 2' are so shaped and so located within the container 1, that their vertical contiguous edges are separated by space determined upon by the relative size of the container 1 and other factors hereinafter disclosed.

The container 1 has at its bottom the discharge duct 5 in which is located the valve 6, adapted for drawing off the contents of the container therethrough. Located on the top of the container and forming a closure therewith, is the hinged cover 7, adapted to swing upwardly on the hinge 8. The catch 9 provides means for securely holding the cover in its position of closure. Located centrally in the cover 7 is an aperture 10, surrounded by an upstanding collar 11. Adapted to reside over the aperture 10 is an inverted cup shaped cover 12, whose downwardly projecting rim 13 is adapted to surround the collar 11, and to form a closure therewith.

Located centrally in the cover 12 is an aperture 14, into which is journaled the shaft 15. The shaft 15 projects downwardly to the bottom of the container 1, having its lower end journaled in the bearing 16.

Located on the upper end of the shaft 15 is the bevel gear wheel 17, which is adapted to mesh with the companion bevel gear wheel 18. The gear wheel 18 is fixed to the armature shaft 19 of the electric motor 20. Located on the shaft 15 are agitator blades A A' and B B'. These agitator blades are hinged on the pivots C and C' to allow their positions to be changed from that of substantially a horizontal plane, to that of a vertical plane. The springs D and D' provide means for normally holding the blades in a horizontal plane. As electrical current is applied to the motor 20, the armature shaft thereof rotates, which in turn rotates the shaft 15. The blades A A' and B B', rotating therewith causes an agitation of the liquid residing within the container 1.

When it is desired to remove the shaft 15 with the agitator blades attached, the cover 12 is lifted, and the blades A A' and B B' are made to fold on the shaft by compressing the springs D and D' facilitating their withdrawal with the shaft 15 through the aperture 10 in the cover 7.

For the purposes of controlling the flow of current through the electrical cables 4 and 4' leading to the electrodes 2 and 2', suitable rheostats are placed in the circuit thereof (not shown). These rheostats may be both manually operated and electrically operated, of forms well known in the art.

To actuate the electrically operated rheostats, current may be supplied from any source of power and to control the flow of this current there is placed in the circuit a thermostatic member to actuate the opening and closing of the circuits operating the rheostats.

For the purpose of illustrating one form of thermostatic circuit control, I have adapted the type shown in U. S. Patent to G. E. Spear No. 1,258,161, granted March 5, 1918, the operation of which is substantially as follows: The active member 21 is located in the liquid and is expanded or contracted according to the temperature, thereby closing or opening either one of the two electric circuits EF or EG, which form connections with the actuating means to cause the rheostats to increase or diminish the current flowing through the circuit cables 4 and 4'.

Thermostatic circuit controls are well known in the art, and I do not limit myself to the specific form referred to herein. The rheostats and thermostatic members per se form no part of this invention, and no further description thereof is deemed necessary.

In the application of my improved method of pasteurization in conducting the tests herein referred to, one quart of milk was placed in a porcelain container fitted with electrodes spaced apart therein. The current used was obtained from a transformer and by passing 9 amperes through the milk for about 5 minutes, the temperature of the milk was raised to 140° F. and the temperature was maintained at this point with the current reduced to about 1.6 amperes.

This current may be used in unlimited volume by using a transformer with a high voltage, low current primary and a low voltage high-current secondary, thus eliminating any dangerous condition which might arise from the use of high voltage. In this manner, all danger to human life, should the person of the operator come within the radius of the current, is eliminated and made absolutely harmless even to shock.

Either the "flash" process, where the milk is subjected to a relatively high temperature for a short period of time, or the "holding" process, where the milk is subjected to a relatively lower temperature, for a relatively long period of time, can be carried out by my method without any physical or chemical change in the milk, except the killing off of bacteria.

The agitator herein referred to, comprising the rotating shaft 15, with the blades A A' and B B' will be adapted to agitate the milk very slowly and quietly, so that no foam appears. This will keep the milk in motion during the time the current is passing through it and prohibits a membrane forming on the surface of the milk.

By my novel method of pasteurization, the milk is placed in a cold receptacle, the electrodes and the agitator, component parts of the apparatus, are also cold, and all heat necessary for the pasteurization temperature is obtained by the resistance of the milk to the electric current flowing through it. The container, although of the same temperature as the milk at all times during the process, obtains its rise in temperature in turn from the milk within it. Obviously, at no time can the container reach a higher temperature than the milk within, from which the container acquires its temperature, and thereby eliminating any possibility of the milk coming in contact with any surface of a higher temperature than the milk itself; and no burning or scorching of the milk can occur.

I do not limit myself to the specific form of agitating means shown, as other means may be employed to accomplish the purposes sought. The agitation of the milk, however, forms an important feature of this invention, as one of the greatest advantages of this method of pasteurization of milk is that the entire mass of milk is at the same temperature during the whole time it is being treated, regardless of the quantity used. Authorities generally complain about this particular point, that it is usually the case with the different methods of pasteurization now in use, that not all of the mass of milk being pasteurized is of the same temperature at the same time, and that some parts of the volume of milk are not held at the pasteurization temperature for the required time. Where it is necessary to have a margin of safety in some forms of pasteurization, say 5 degrees in order to insure the required temperature throughout the milk, this additional degree of heat is not necessary in my method.

The use of my method eliminates the necessity of elaborate and expensive equipment in boilers, steam conveyors and the like, necessary in the common forms of pasteurizing equipment now in use.

Another advantage obtained in the use of my method is its application to thoroughly cleansing the apparatus. After the treatment of the milk and the milk has been drawn from the container, it can be easily washed by filling it with water, adding a soda solution and applying the current to the electrodes without the use of the thermostat. The water can be brought to a boiling point, and the rotation of the agitating means will thoroughly clean the container and elements therein. A discharge of the washing solution and a rinsing with clean water leaves the apparatus perfectly clean.

While I have herein described an apparatus most suitable for domestic household purposes, I do not limit my invention to the specific form shown, as other forms of apparatus may be used without departing from the spirit of my invention. Although the process herein has been described in connection with the increasing of the temperature of milk, other liquids and semi-liquid foods may be treated by the same process, and I may vary the temperature and periods of time of such temperatures to correspond to the character of each liquid treated.

Having thus described my invention, what I claim and desire to secure by Letters Patent, is:

1. An apparatus for pasteurizing milk and the like, comprising a container for holding the milk, a pair of electrodes spaced apart therein, means for increasing the temperature of the milk by transmitting an electric current through the milk interposed between the electrodes and mechanical means for agitating the milk during the passage of said current therethrough.

2. An apparatus of the character described, comprising a container for holding liquids, electrodes spaced apart within said container, means for increasing the temperature of the milk by transmitting an electric current from one electrode to the other through the liquid interposed therebetween, means for controlling the energy of said electric current and means for keeping the liquid in motion during said operation.

3. An apparatus of the character described, comprising a container for holding liquids, electrodes spaced apart within said container, means for transmitting an electric current from one electrode to the other through the liquid interposed therebetween, means for automatically controlling the energy of said electric current, actuated by the change in temperature of said liquid.

4. An apparatus for pasteurizing milk and the like, comprising a container for holding the milk, a pair of electrodes spaced apart and immersed in said milk, means for increasing the temperature of the milk by transmitting an electric current through the milk interposed between the electrodes, and means for continually passing the milk through the zone of resistance encountered by the electric current passing between the electrodes, substantially as described.

5. An apparatus for pasteurizing milk comprising heating means, agitating means, and heat controlling means actuated by the heating means.

6. An apparatus of the character described, comprising electric current transmitting means, current resisting means, resistance agitating means, and heating means created in the resistance means to actuate the control of the current transmitting means.

7. An apparatus of the character described, comprising electric current transmitting means, current resisting means, heating means created in the resisting means to actuate the control of the current transmitting means, and agitating means for maintaining a continuous flow of the resisting means.

8. An apparatus of the character described comprising a milk containing receptacle formed with a hinged cover thereto, an electric motor mounted on said cover, a rotating milk agitator located within said receptacle actuated by said motor, electric current transmitting electrodes located in said container having their contiguous edges spaced apart, an electric circuit formed with the milk interposed between the electrodes and means for transmitting an electric current through said circuit, adapted to increase the temperature of the milk by the resistance of the current therethrough.

9. An apparatus of the character described comprising a milk containing receptacle formed with a hinged cover thereto, a rotating member positioned centrally in said receptacle adapted to convey movement to the milk, actuating means to rotate said rotating member, electric current transmitting electrodes located in said container having their contiguous edges spaced apart, an electric circuit formed with the milk interposed between the electrodes, means for transmitting an electric current through said circuit and thermostatic controlling means located intermediate of the electrodes to actuate a variance in said current.

10. The herein described method of pasteurizing milk which consists in intermittently subjecting the milk to an increased temperature by passing the milk in and out of a zone of resistance encountered by an electric current passing between electrodes.

11. The herein described method of pasteurizing milk which consists in slowly increasing its temperature by passing the milk in and out of a zone of resistance encountered by an electric current passing between electrodes.

12. The herein described method of pasteurizing milk which consists in creating within a mass of milk, a zone of relative high temperature, constantly displacing the milk in the high temperatured zone by milk from a lowered temperatured zone until all zones within said mass have an equal temperature.

13. The method of pasteurizing milk which consists in creating within a mass of milk, a zone of relatively high temperature, constantly displacing the milk in the higher temperatured zone by milk from a lower temperatured zone until all zones within said mass of milk have reached a given temperature and maintaining said temperature throughout said mass for a fixed period of time.

14. The herein described method of pasteurization of milk and the like which consists in creating within a mass of milk, a zone of relatively high temperature, constantly displacing the milk in the higher temperatured zone by milk from a lower temperatured zone within said mass, until all zones within said mass of milk have reached a pasteurizing temperature, holding the milk at said temperature for a relatively long period of time, subsequently increasing the temperature for a relatively short period of time, and then reducing the temperature.

In testimony whereof I have affixed my signature in the presence of two witnesses.

THOMAS H. ANGLIM.

Witnesses:
CHARLES E. ANGLIM,
THOS. R. DONOVAN.